(12) United States Patent
Harel et al.

(10) Patent No.: US 8,250,257 B1
(45) Date of Patent: Aug. 21, 2012

(54) TECHNIQUES FOR BALANCING SYSTEM I/O LOAD

(75) Inventors: Shay Harel, Marlborough, MA (US); Peter Puhov, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/928,283

(22) Filed: Dec. 8, 2010

(51) Int. Cl.
*G06F 3/00* (2006.01)
*G06F 13/00* (2006.01)

(52) U.S. Cl. .......................... 710/38; 711/114
(58) Field of Classification Search .................. 710/38; 711/114
See application file for complete search history.

(56) References Cited

U.S. PATENT DOCUMENTS

| | | | | |
|---|---|---|---|---|
| 7,849,073 | B2 * | 12/2010 | Young-Lai | 707/713 |
| 2006/0259597 | A1 * | 11/2006 | Jiang et al. | 709/222 |
| 2011/0167217 | A1 * | 7/2011 | Montgomery | 711/114 |

* cited by examiner

*Primary Examiner* — Hyun Nam
(74) *Attorney, Agent, or Firm* — Muirhead and Saturnelli, LLC

(57) ABSTRACT

Described are techniques for performing I/O operations. A graph is received including a plurality of nodes and edges. The graph includes a first level with a root node and one or more other levels of nodes. Each edge has a value indicating an I/O load metric. A thread associated with a first node determines whether to perform a background I/O operation directed to a first device and having a first priority. The first priority is compared to a first value of an I/O load metric. The first value is determined in accordance with criteria including a maximum usage of an I/O buffer of the first device and priorities of other I/O operations directed to the first device. If it is determined that the background I/O operation is to be performed, the background I/O operation is forwarded for processing on an I/O path having a corresponding path in the graph.

20 Claims, 13 Drawing Sheets

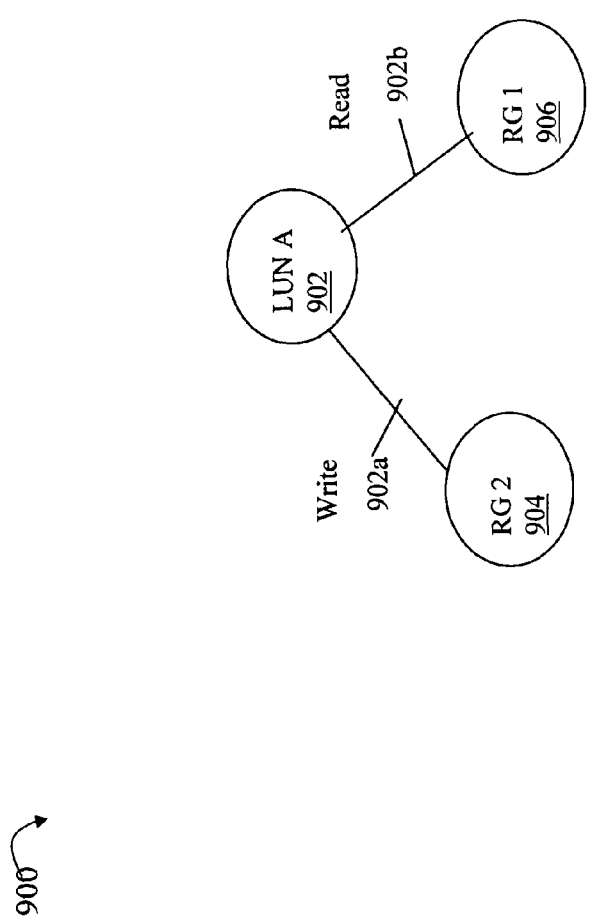

TECHNIQUES FOR BALANCING SYSTEM I/O LOAD

BACKGROUND

1. Technical Field

This application generally relates to data storage systems, and more particularly to techniques used in connection with management of data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, a centralized scheduler may be used to schedule processing of host-generated I/Os and other I/O operations, such as background I/O operations internally generated and initiated by the data storage system. In such embodiments, the centralized scheduler has sufficient knowledge to schedule and coordinate host-generated I/Os and background I/O operations.

SUMMARY OF THE INVENTION

In accordance with one aspect of the invention is a method for performing I/O operations in a system. A graph is received including a plurality of nodes and edges between pairs of the plurality of nodes. The graph includes a plurality of levels of nodes where the plurality of levels includes a first level with a root node and one or more other levels each including a portion of the plurality of nodes. Each node in the one or more other levels corresponds to an object associated with a physical or logical entity in the system. Each of the edges has a value indicating an associated I/O load metric. It is determined, by a thread associated with a first of the plurality of nodes included at a first of the one or more other levels, whether to perform a background I/O operation that is directed to a first device and has a first priority. The determining includes comparing the first priority to a first value of an I/O load metric associated with a first edge between the first node and a second of the plurality of nodes. The first value is determined in accordance with criteria for a time period, said criteria including a maximum usage of an I/O buffer of the first device and priorities of other I/O operations directed to the first device. If it is determined that the background I/O operation is to be performed, the background I/O operation is forwarded for processing on an I/O path having a corresponding path in the graph. The corresponding path includes the first node, the first edge, and the second node. If it is determined that said background I/O operation is not to be performed, a counter tracking a number of times said background I/O operation is not performed may be updated. If the first value is greater than said first priority, first processing may be performed where the first processing includes determining whether said thread has previously determined not to perform the background operation a threshold number of times; and if the thread has previously determined not to perform the background operation a threshold number of times, performing the background operation, and otherwise, updating a counter indicating a current number of times the thread has determined not to perform the background operation. If the first value is not greater than said first priority, it may be determined that the background I/O operation is to be performed and said forwarding may be performed. The background I/O operation may be directed to a first physical device having a corresponding first leaf node in said graph. The corresponding path may include the corresponding first leaf node. The method may include receiving, from a client external to the system, a second I/O operation directed to a second device of the system; and forwarding the second I/O operation for processing on a second I/O path having a second corresponding path in said graph, said second corresponding path including one of said plurality of nodes associated with said second device. The method may also include mapping a second priority of said second I/O operation to a third priority, wherein said second priority is a priority from a first set of priorities associated with said client and wherein said third priority is a priority from a second set of priorities associated with said system. The method may include periodically performing first processing by a thread associated with an object corresponding to said first device, said first processing including: determining a current value for an I/O load metric for the first device; and determining whether to performing processing to update one or more values associated with one or more edges of said graph. The first processing may further comprise performing, for a current time period: determining an average priority of I/O operations directed to the first device for the current time period; determining a factor for the current time period, wherein the factor is determined in accordance with said maximum usage; and determining said current value by adding said average priority and said factor. The factor for a time period, T, for the first device may be represented as:

$$\text{Factor}(T) = \frac{(\text{said maximum usage} - (\text{buffer size}/2)) * (\text{maximum priority}/2)}{(\text{buffer size}/2)}$$

wherein buffer size represents a number of entries in the I/O buffer, said maximum usage representing a largest amount of entries in the I/O buffer occurring at a point in time in the time period T, and maximum priority is a largest possible priority assignable to an I/O operation. The current value may be associated with one edge of said graph between one of said plurality of nodes associated with said first device and another one of said plurality of nodes. For a node N1 at level N in the graph having a plurality of child nodes which are at level N+1 of the graph and connected to said node N1 by a first set of edges, a value of an edge E2 between said node N1 and a parent node N2 at a level N−1 of the graph may be determined in accordance with values associated with edges of said first set. The system may be a data storage system. The background I/O operation may be an I/O operation initiated within a backend of the data storage system and not initiated as a result of an I/O operation from a client external to the data storage system. The background I/O operation may include any of a RAID rebuild operation to read or write parity or user data of a RAID group, writing a value to initialize a portion of a physical device, and performing an I/O operation to assess or monitor status of a physical device. Determining whether to perform processing to update one or more edges of said graph may include determining whether said current value for an I/O load metric for a current time period, T, has changed by a threshold amount with respect to an immediately preceding time period, T−1. Periodically, values of an I/O load metric associated with physical devices corresponding to leaf nodes of the graph may be calculated, and if one or more of said values for a time period T have changed by a threshold amount with respect to other values of an I/O load metric associated with the physical devices for an immediately preceding time period, T−1, said one or more values associated with a portion of said leaf nodes may be used to determine updated values for a portion of the edges included on one or more paths of the graph, each of the one or more paths including a leaf node from the portion and the root node.

In accordance with another aspect of the invention is a computer readable medium comprising code stored thereon for performing I/O operations in a system, the computer readable medium comprising code stored thereon which, when executed performs processing including: receiving a graph including a plurality of nodes and edges between pairs of said plurality of nodes, said graph including a plurality of levels of nodes, said plurality of levels including a first level with a root node and one or more other levels each including a portion of said plurality of nodes, each node in said one or more other levels corresponding to an object associated with a physical or logical entity in the system, each of said edges having a value indicating an associated I/O load metric; determining, by a thread associated with a first of said plurality of nodes included at a first of said one or more other levels, whether to perform a background I/O operation that is directed to a first device and has a first priority, said determining including comparing said first priority to a first value of an I/O load metric associated with a first edge between said first node and a second of said plurality of nodes, wherein said first value is determined in accordance with criteria for a time period, said criteria including a maximum usage of an I/O buffer of the first device and priorities of other I/O operations directed to said first device; and if it is determined that said background I/O operation is to be performed, forwarding said background I/O operation for processing on an I/O path having a corresponding path in said graph, said corresponding path including said first node, said first edge, and said second node. If it is determined that said background I/O operation is not to be performed, a counter tracking a number of times said background I/O operation is not performed may be updated.

BRIEF DESCRIPTION OF THE DRAWINGS

Features and advantages of the present invention will become more apparent from the following detailed description of exemplary embodiments thereof taken in conjunction with the accompanying drawings in which:

FIG. 13 is an example of a portion of a graph that may be used in an embodiment in accordance with techniques herein.

DETAILED DESCRIPTION OF EMBODIMENT(S)

Figure 1:
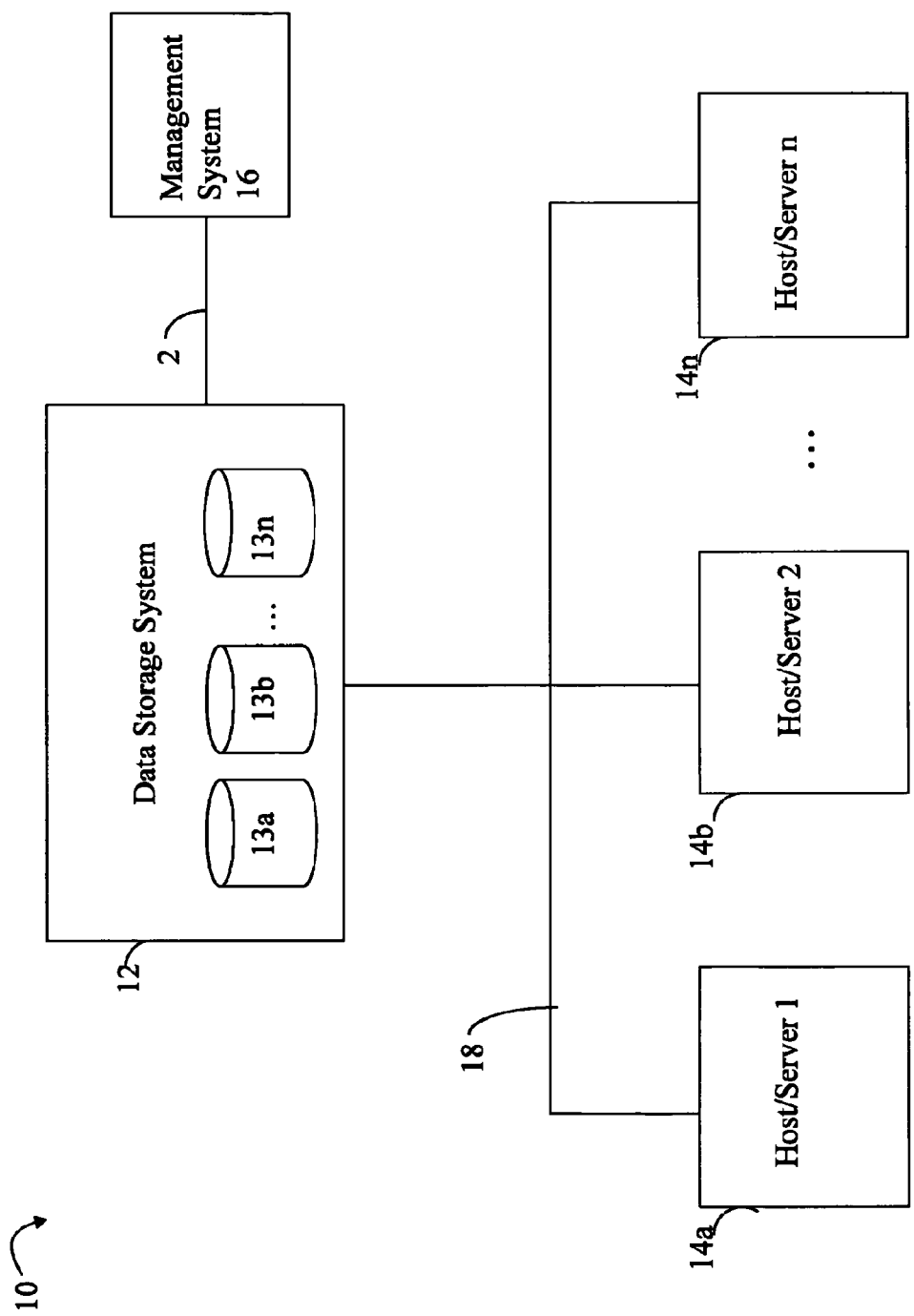
FIGS. 1 and 3 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
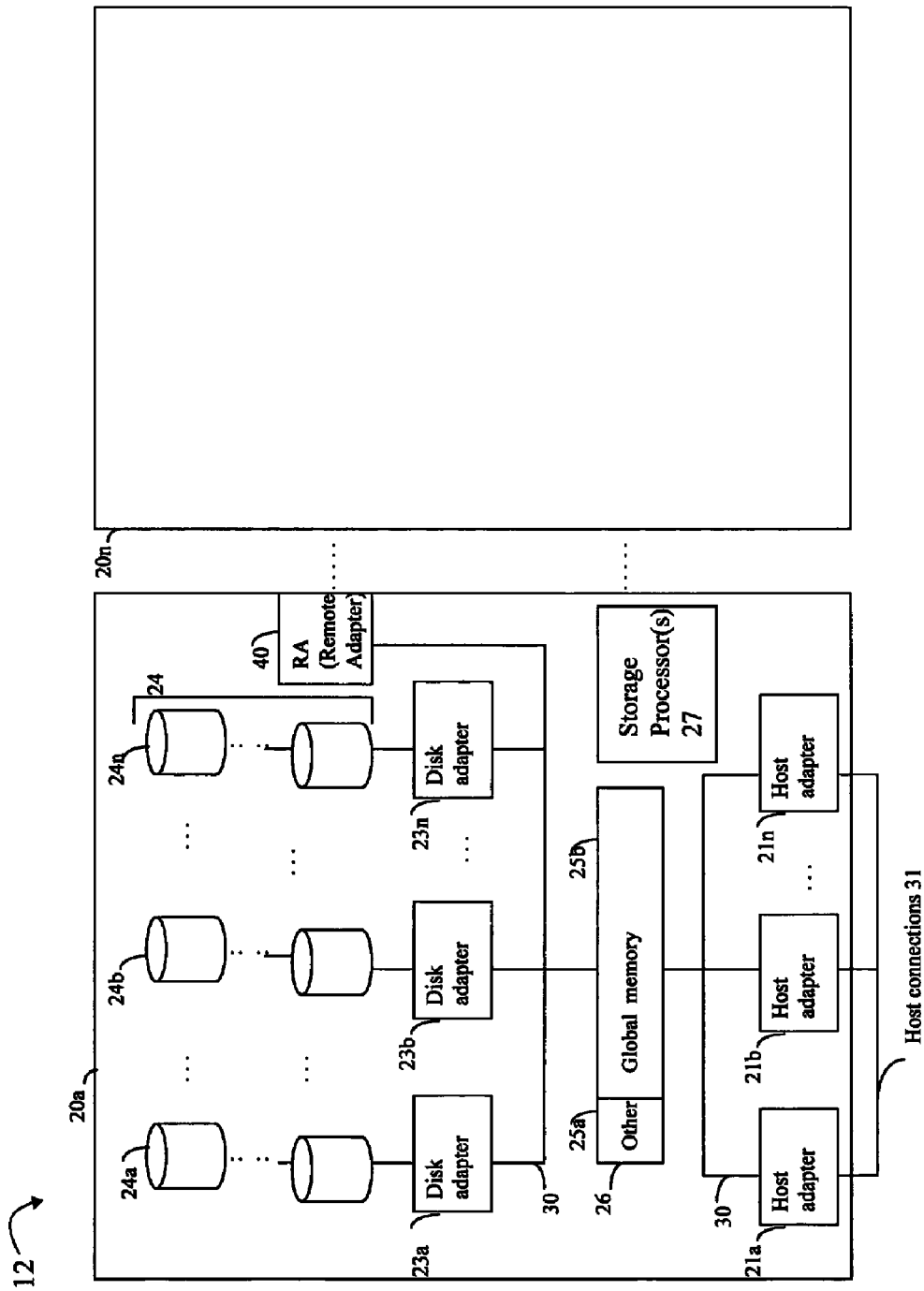
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

I/O operations performed in a data storage system may include I/O operations of a first type which are received by the data storage system from an external client, such as a host. I/O operations performed by the data storage system may also include other I/O operations of a second type which are not initiated by the host or other external client. Rather, these other I/O operations may be initiated from within the data storage system, such as by a backend component of the data storage system. I/O operations of this second type may be referred to as background I/O operations which are not executed in a context of a host I/O, or more generally, in a context of an external client I/O operation. Background I/O operations may include I/O operations performed in connection with, for example, monitoring and maintaining the data storage system such as repairing a RAID drive (e.g., read and/or write operations in connection with correcting corrupted user data and/or RAID parity information), performing an I/O operation to check on the status and proper functioning of a physical drive, initializing a physical drive by writing out a particular initialization value or pattern to physical drive portions, and the like.

Figure 3:
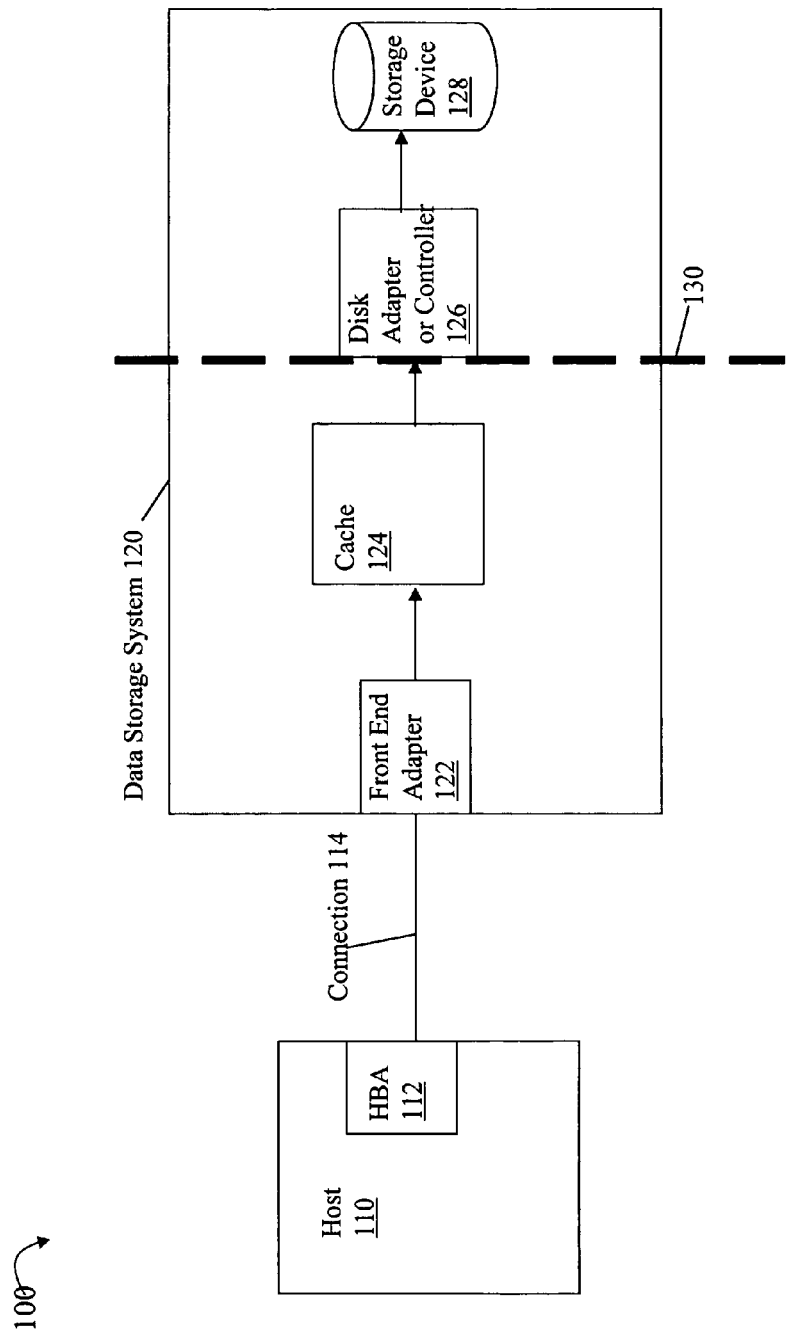

With reference to FIG. 3, shown is an example 100 illustrating components of a system that may be used in performing the different types of I/O operations in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the first type described above. The DA is an example of a backend data storage system component that may also initiate I/O operations. For example, the DA may initiate an I/O operation to periodically test or verify the health and status of the physical device 128. This latter I/O operation as initiated by the DA may be characterized as a background I/O operation described above which is not in the context of an I/O operation from the host or other client external to the data storage system. In such an embodiment, line 130 may represent an imaginary line within the system 120 partitioning the backend from the front end of the data storage system 120. In this embodiment, the background operations may be characterized as data storage system initiated operations and, more particularly, in some embodiments, such background operations may be initiated by a backend component such as a DA.

In a system such as a data storage system described above, there is contention for resources of the data storage system when performing the different types of I/O operations. Described in following paragraphs are techniques that may be used in connection balancing the load of externally originated or initiated I/O operations (e.g., the first type described above) and background I/O operations (e.g., the second type described above). Such techniques may include monitoring parameters affecting the load on physical devices of the system. The parameters may include the size or number of entries of the I/O buffers of the physical drives and the priorities of the I/O operations. The techniques herein utilize a distributed approach where, for example, each object in an object-oriented embodiment performs processing to monitor and assess whether it should perform a background I/O operation.

Figure 4:
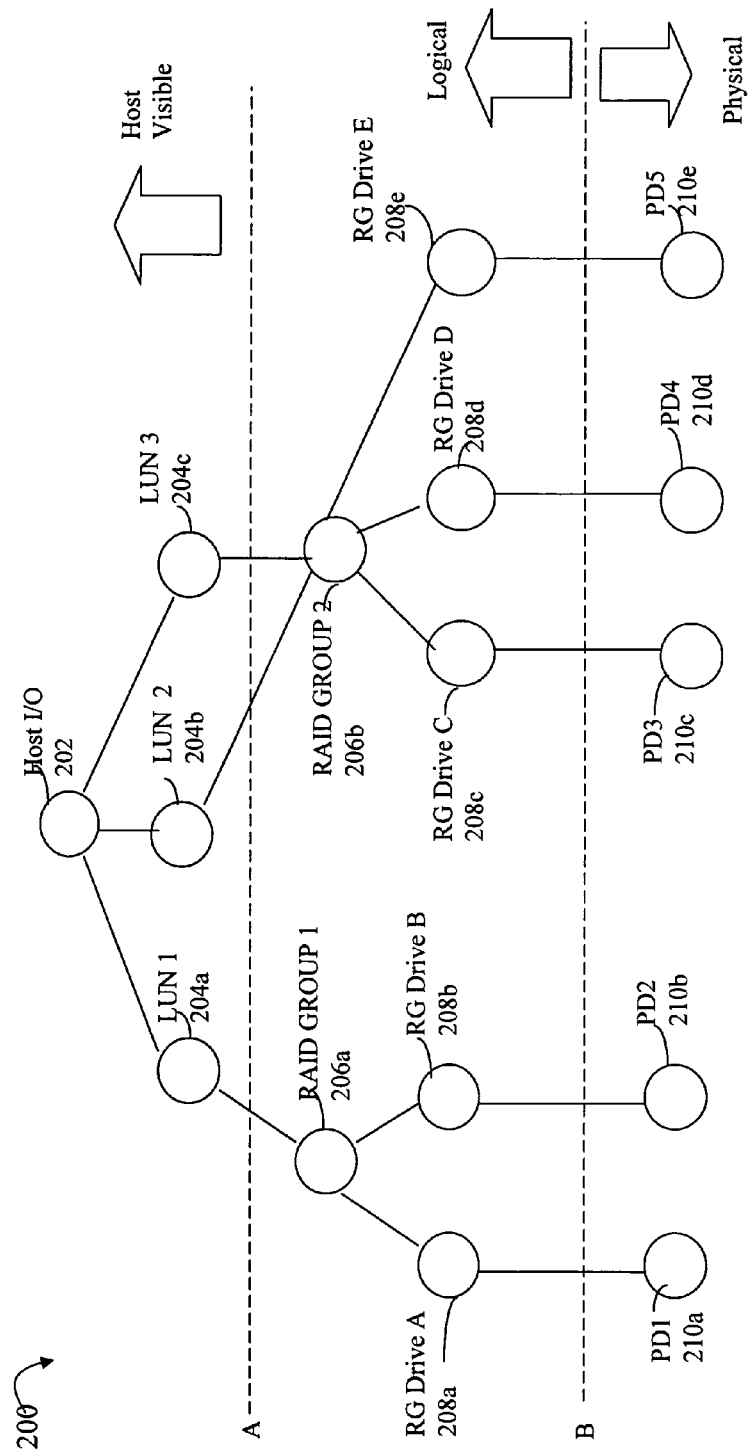
FIGS. 4 and 7 are examples of graphs that may be used in an embodiment in accordance with techniques herein.

Referring to FIG. 4, shown is an example of a graph that may be used in an embodiment in accordance with techniques herein. The example 200 includes a graph with nodes and edges between the nodes. The graph in this example forms a tree having a root node 202 at a first level, nodes 204a-204c at a second level, nodes 206a-206b at a third level, nodes 208a-208e at a fourth level and leaf nodes 210a-210e at a fifth level. The graph may be a representation of logical and/or physical components in the data storage system with the root node 202 corresponding to an aggregator or external interface node for the data storage system, or more specifically, an interface node to the backend of the data storage system. Each node in the graph other than the root node represents an object associated with a corresponding physical or logical entity in the data storage system. The leaf nodes at the fifth level correspond to objects associated with physical storage devices, such as disk drives (e.g., Fibre channel drives, SATA drives) or SSDs. Nodes at levels other than the first level (root node) and bottom most level (level 5 including leaf nodes 210a-210e) may correspond to, for example, RAID groups, drives or members of a RAID group, LUNs, and the like. In this example, nodes 204a-204c correspond, respectively, to objects associated with LUNs 1-3, nodes 206a-206b correspond, respectively, to objects associated with RAID GROUPS 1 and 2, nodes 208a and 208b correspond to objects associated with RAID drives or members of RAID GROUP 1, nodes 208c-208e correspond to objects associated with RAID drives or members of RAID GROUP 2, and nodes 210a-210e correspond to objects associated with physical storage devices as described above.

A path in the graph may correspond to an I/O path over which an I/O operation may be forwarded to a physical device (PD) for processing. For example, a host I/O operation directed to LUN 3 to write data may result in writing user data and/or parity information to a portion of PD5 forwarded along the path represented by nodes 202, 204c, 206b, 208e, 210e. The foregoing may be a complete path from the root to a leaf node. An I/O operation, such as a background I/O operation, may be forwarded along a path from a first node which is at a level M in the graph, M>1 (e.g., the root node is at level 1), to one of its descendant nodes in the graph, such as one of the leaf nodes or other nodes at a level >M in the graph.

Each object may be, for example, a software driver on the data storage system. Each object has its own monitor thread which periodically performs background I/O operations and possibly other operations to ensure status, health and other aspects of the object. Such processing including background I/O operations initiated by the monitor thread may, for example, determine whether the object is healthy and either currently serving/performing processing for a client, or whether the object is in a state where it is ready and capable of performing processing for a client if requested. The monitor threads of the objects may be scheduled for execution in the data storage system along with other threads and/or processes. The monitor threads may be allocated portions of CPU time for execution also known as time slices during which the foregoing, including background I/O operations, may be initiated and/or performed. If a monitor thread determines that its associated object is not in a healthy or ready state (e.g, ready to service a request), processing may be performed by the monitor thread using its time slice to place the object in such a ready state. For example, as part of rebuilding data for a drive of a RAID GROUP, the monitor thread during its time slice may issue and execute appropriate read and/or write operations executed in the context of the monitor thread as background I/O operations.

It should be noted that the graph of FIG. 4 may include other levels and nodes that may vary with an embodiment. For example, the graph may also include nodes corresponding to objects associated with ports, physical drive enclosures for groups of drives, other logical types of devices, and the like.

Also included in the example 200 are dashed lines denoted as A and B. Portions of the graph above line A may represent those entities of the data storage system which are visible to the host or other external client. For example, the host may send I/O requests directed to one or more LUNs. The host does not have any knowledge regarding underlying RAID groups that may be included in an embodiment. Nodes below line A may correspond to entities known or exposed within the data storage system, but not to the host. Dashed line B represents the partitioning of the graph into nodes corresponding to physical and logical entities. Nodes above line B (other than the root) may correspond to logical entities (e.g., LUNs, RAID groups, RAID drives or members) of the data storage system. Nodes below line B may correspond to physical entities, such as physical storage devices, of the data storage system.

As will be described in detail below, the edges in the graph of FIG. 4 may be populated with values determined in connection with techniques herein representing current I/O loads. Monitor threads of the objects may use the foregoing values in determining whether to perform a particular background I/O operation having an associated priority. The techniques herein use a distributed, decentralized approach in which each object determines whether it should issue a background I/O operation at a point in time. Before describing the graph and its usage in more detail, priorities associated with I/O operations are discussed in connection with FIG. 5 and the I/O buffer associated with each physical device is discussed in connection with FIG. 6.

Figure 5:
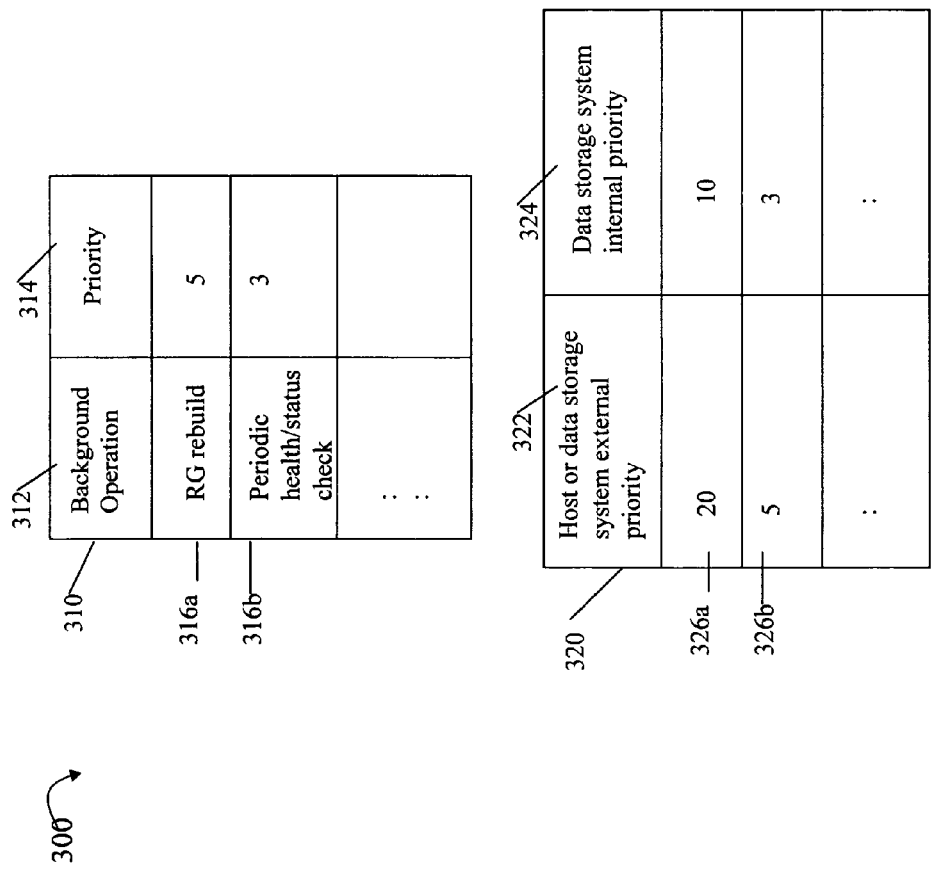
FIG. 5 is an example illustrating tables including priorities that may be used in an embodiment in accordance with techniques herein.

Referring to FIG. 5, shown is an example of tables that may be used in connection with I/O operation priorities in an embodiment in accordance with techniques herein. The example 300 includes a table 310 of data storage system internal priorities as used by each monitor thread. The table 310 may include a first column 312 of types of background I/O operations and a second column 314 of priorities for the different background I/O operations. Each row of the table 310 specifies a priority in column 314 for a corresponding background I/O operation in column 312. For example, row 316a indicates that background I/O operations performed in connection with a RAID GROUP (RG) rebuild have an associated priority of 5. Row 316b indicates that background I/O operations performed in connection with periodically assessing the health or status of a physical drive have an associated priority of 3. In one embodiment, the priorities in table 310 may be in the inclusive range of 1 (lowest, least important) through 10 (highest, most important). The priorities in table 310 may be used within the data storage system and assigned by each monitor thread initiating a background operation. The monitor thread may create an I/O request packet and include in the packet a priority for the particular background I/O operation based on the table 310. In some embodiments, the priorities of table 310 may be configurable such as via a command line interface.

The example 300 includes a table 320 used to map external priorities of column 326 to corresponding data storage system internal priorities of column 324. For example, in one embodiment, the host I/O operations may be specified using an I/O request packet from the host including a host-specified priority. The host-specified priority may be mapped or translated to a data storage system internal priority using table 320. In one embodiment, the host priority may be in the inclusive range of 1 through 20. Each such host priority may be mapped to a corresponding data storage system internal priority in the inclusive range of 1 through 10. In this way, each host I/O operation is assigned a priority using the same scale as the background I/O operations. To further illustrate, row 326a of table 320 specifies that a host I/O operation having a priority of 20 is assigned a data storage system internal priority of 10. Row 326a may represent the priorities associated, for example, with an I/O operation to dump the contents of cache to a non-volatile storage device such as upon the occurrence of a primary power failure. As described above, such contents in cache may include data of host write operations which has not yet been destaged to the appropriate physical device and such operations may be assigned a high priority upon the occurrence of a primary power failure. Row 326b of table 320 specifies that a host I/O operation having a priority of 5 is assigned a data storage system internal priority of 3. An I/O packet corresponding to the host I/O operation may be accordingly updated to include the priority from column 324 when forwarded for processing to the backend along an I/O path such as illustrated as a path of the graph of FIG. 4. With reference back to FIG. 4, it should be noted that as described above, the root node of the graph may be characterized as corresponding to an interface to the backend of the data storage system. Thus, the host priority may be mapped to a data storage system internal priority used by the backend and objects in the graph other than the root node in connection with techniques herein.

Figure 6:
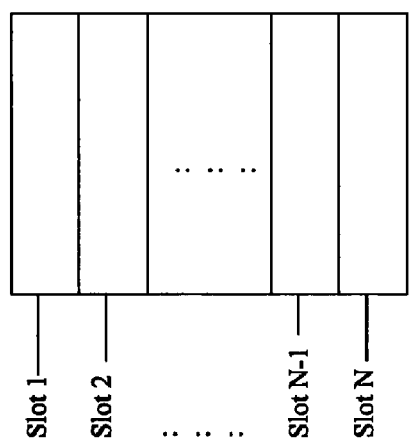
FIG. 6 is an example illustrating an I/O buffer of a physical device in an embodiment in accordance with techniques herein.

Referring to FIG. 6, shown is an example of an I/O buffer of a physical drive in an embodiment in accordance with techniques herein. Each physical drive has an I/O buffer as illustrated in the example 400 with a plurality of N slots or entries where each slot or entry is used for a single I/O operation directed to the drive for processing. The size of the buffer, N, may vary with embodiment and drive type. For example, with one type of FC drive, the buffer includes N=16 slots for 16 I/O operations to be processed by the physical drive. The drive's I/O buffer may be stored in the internal memory of the drive such as internal memory of an FC drive. When an I/O operation is forwarded along an I/O path (e.g., between objects) of the graph of FIG. 4, an I/O request packet for the I/O operations is received by a physical drive and placed in an I/O buffer of the drive as illustrated in FIG. 6 for processing. Thus, as more I/Os are directed to the drive within a period of time, the level or number of entries in the drive's I/O buffer used for storing I/O operations awaiting processing may also increase.

In connection with techniques herein, different aspects of the physical devices may be monitored in order to determine I/O load metrics for the drives and also the system. An embodiment in accordance with techniques herein may desire to keep the physical drives sufficiently "busy" by balancing or regulating the resources allocated for use with background I/O operations and also host or data storage system external I/Os. The techniques herein also provide for adaptability to dynamic changes in system I/O load. It may be desirable to keep the physical drives sufficiently busy processing background I/O operations without causing resources of the drives to be overly busy so that there is an unacceptable delay in processing possibly more important host I/Os.

With reference back to FIG. 4, as each I/O packet is received by a physical drive, the physical drive's object (PDO, represented by a lead node in the graph) performs processing to monitor and collect information about the I/O load of the drive. For a period of time, the PDO may determine the total I/Os directed to the physical device within the time period, the sum of the priorities of the total I/Os directed to the physical device within the period of time, and the maximum usage or fullness of the physical drive's I/O buffer. The maximum usage may represent the "highest" or maximum number of slots in the I/O buffer in which I/O requests are stored for processing (e.g., the highest level of the I/O buffer observed during the time period). Based on the foregoing information collected, an I/O load metric value for the physical device may be determined. Additional details as to how an embodiment may determine this metric are described below. From this value of the I/O load metric for the physical drive, a value is assigned to a first edge in the graph connecting the node corresponding to the physical drive to other nodes. Additionally, other values for the I/O load metric are propagated up the graph to other edges connected, directly or indirectly, to the first edge.

Figure 7:
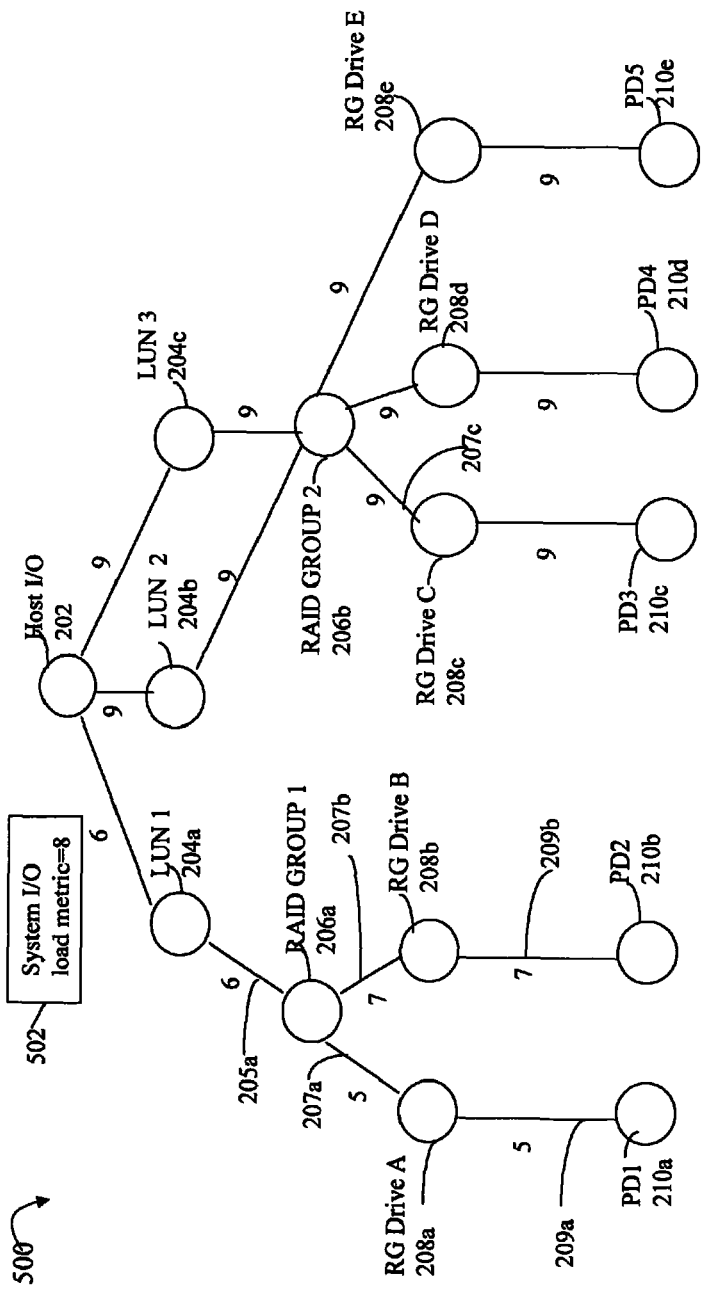

To further illustrate, reference is made to FIG. 7 which is an example 500 including the graph of FIG. 4 further annotated with edge values representing the I/O loads for the edges. For example, with reference to FIG. 7, assume an I/O load metric value of 5 is associated with the PDO for node 210a, then a value of 5 is associated with the edge 209a between nodes 210a and 208a and also an edge 207a between nodes 208a and 206a. Also, let an I/O load metric value of 7 be associated with the PDO for node 210b, then a value of 7 is associated with the edge 209b between nodes 210b and 208b and also the edge 207b between 208b and 206a. A value for the edge 205a between nodes 206a and 204a (e.g., edge from the node 206a to its parent 204a) may be determined based on values associated with edges 207a and 207b (e.g., edges from the parent node to its child nodes). In one embodiment, a value for edge 205a may be the average of values associated with edges 207a and 207b (e.g. average of 6=(5+7)/2). Other embodiments may use other techniques for determining and propagating values of the I/O load metric for the edges in the graph. For example, rather than take an average as described above, an embodiment may determine the maximum of the edge values between a node and its children and use this maximum as the value for the edge between the node and its parent.

In a manner similar to that as described above, other PDOs (e.g., leaf nodes) of the graph 500 associated with other physical devices may determine corresponding I/O load metric values and accordingly, I/O load metric values may be determined for the remaining edges of the graph.

Thus, as just described, I/O operations generated by host or as a result of background operations flow down the graph to the PDOs which determine corresponding values for the I/O load metric of each physical drive. The values for the I/O load metric of the PDOs are assigned to graph edges extending from the PDOs. Edge values are accordingly determined and propagated upwards in the graph toward the root. In connection with the foregoing, the root node may be associated with a value representing the system I/O load metric (e.g., aggregate I/O load based on all physical drives). As illustrated in 502, for this example, the system I/O load metric may be 8.

When a monitor thread for an object having a corresponding node in the graph wants to perform a background operation, a priority for the background operation is obtained in accordance with the table 310 of FIG. 5. The monitor thread determines the path over which the background operation is to be sent and examines the appropriate edge in the graph. For example, if the monitor thread for node 206b wants to perform a background I/O operation to physical drive (PD) 3 associated with node 210c, the value (=9) of edge 207c is examined. As with all edge values, the value of the edge 207c represents the current I/O load of the edge or portion of the I/O path over which the background I/O is to be forwarded. A comparison is made between the priority of the background operation and the value of the I/O load metric associated with edge 207c. If the priority of the background operation is the same or larger than the value of the I/O load metric associated with the edge 207c, the monitor thread forwards the background I/O request on the path over edge 207c. Otherwise, the monitor thread may currently forego forwarding the background I/O request on this path until a later point in time. This later point in time may be the earlier occurrence of when the edge value is less than the priority of the background I/O operation, or it is determined that monitor thread has yielded in performing the background I/O operation a threshold number of times. In one embodiment, a counter may be maintained indicating a number of times that the monitor thread has yielded or decided not to perform the background I/O operation due to its priority not being equal to or greater than that of the edge 207c. When the counter reaches a threshold number of times, the monitor thread may perform the background operation even though its priority is not equal to or larger than the I/O load metric value of the edge 207c. As described above, the monitor thread may be scheduled for execution for its time slice to perform its monitoring activities including forwarding the background I/O operation for processing to PD3. If the monitor thread does not forward the background I/O operation due to the background operation's priority not being equal to or greater than that of the edge 207c, the monitor thread may wait until its next scheduled time slice before re-evaluating whether to perform and forward the background I/O operation on the path over edge 207c.

In one embodiment, each PDO may monitor the I/O load of its associated physical device and perform calculations to determine a current value for the I/O load metric every 3 seconds or other fixed time period. At each fixed time period, the PDOs may also perform processing to determine whether to update the edge values indicating the I/O load for the edges in the graph. If there has been a threshold level of change with the current I/O load metric for a physical device, appropriate edge values of the graph may be updated. An embodiment may determine whether there has been a threshold level of change with respect to the I/O load metric for a physical device in a variety of different ways. In one embodiment, a comparison may be made between the current I/O load metric of a physical device for the current time period and the immediately previous I/O load metric (e.g., for the previous time interval). If the metric has changed (e.g., increased or decreased) by more than a threshold percentage, such as by at least 30% of the prior I/O load metric, edge priorities may be updated by propagating updated edge priority values up the graph. Otherwise, if there has not been a sufficient level of change in the I/O load metric since the previous time period for a physical device, there are no edge values updated or propagated based on the current I/O load metric for the physical device. It should be noted that an embodiment may use any one or more other techniques to determine whether to propagate updated values for graph edges.

For each time period, the PDO may obtain the total number of I/Os received, determine the sum of the priorities of all such I/Os during the time period, and determine the maximum usage of the physical device's I/O buffer (e.g., high level of buffer during time period). The foregoing three metrics may be maintained for the duration of the time period as each I/O for the physical device is received. At the end of the time period, the PDO may perform processing using these three metrics. The processing may include calculating the average priority based on the total I/Os during the time period and the sum of their priorities. The average priority for a time period T for a PDO and its associated physical device may be represented as:

$$\text{Average priority } (T) = \text{Sum of priorities/Total I/Os} \qquad \text{EQUATION 1}$$

where "Sum of priorities" is determined by adding all priorities of all I/Os directed to the physical device associated with the PDO during the current time period T; and "Total I/Os" is the number of I/Os directed to the physical device associated with the PDO during the current time period T.

Additionally, a factor for the time period T may be determined and represented as:

$$\text{Factor}(T) = \frac{(\text{maximum usage} - (\text{buffer size}/2)) * (\text{maximum priority}/2)}{(\text{buffer size}/2)} \qquad \text{EQUATION 2}$$

where

"maximum usage" is as described above (e.g., highest level or maximum number of entries of the device's I/O buffer used during the time period T);

"buffer size" is an integer quantity representing the size as a number of entries for I/O operations of the physical device's buffer (e.g., size N of the I/O buffer of FIG. 6); and "maximum priority" is the maximum priority in the defined range of data system internal priorities (e.g., largest possible priority in the range that can be assigned).

It should be noted that the quantities represented by "buffer size/2" and "maximum priority/2" are constants for a given configuration. Factor (T) may be a positive or negative quantity. With reference back to FIGS. 5 and 6, "buffer size" is 16 and "maximum priority" is 10 in the illustrated example.

The current I/O load for the physical device is determined by the PDO for the current time period T and may be represented as:

$$\text{I/O load } (T) = \text{Average priority } (T) + \text{Factor } (T) \qquad \text{EQUATION 3}$$

What will now be described are flowcharts in FIGS. 8, 9, 10, and 11 summarizing processing described above as may be performed in an embodiment in accordance with techniques herein.

Figure 8:
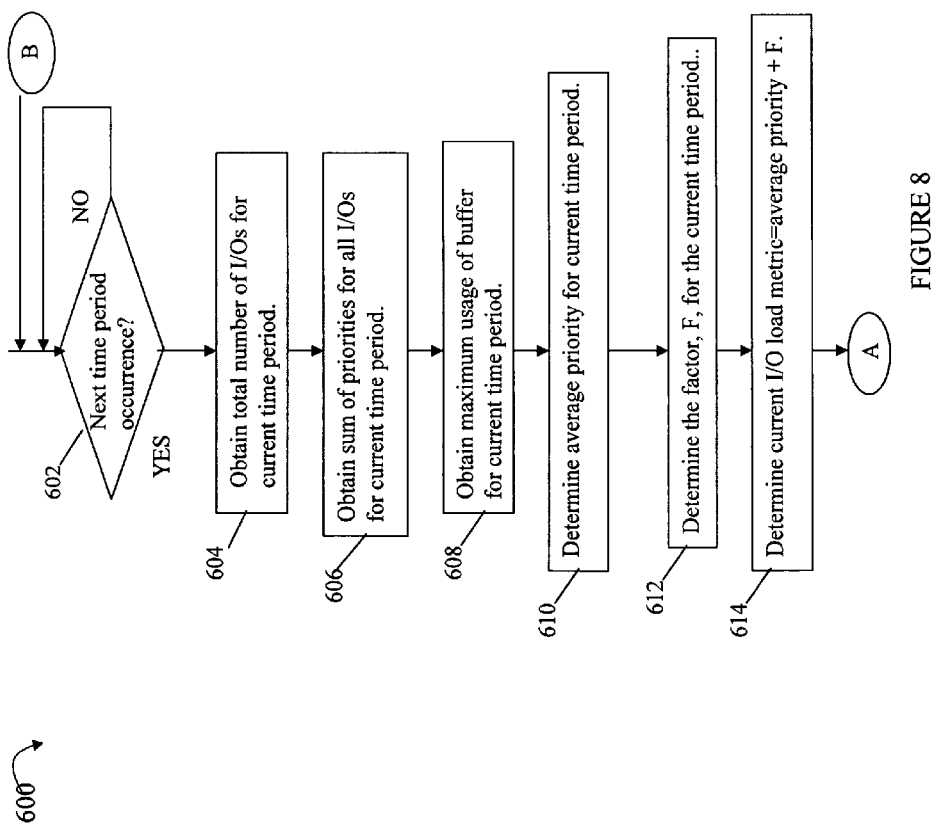
FIGS. 8, 9, 10, 11, and 12 are flowcharts of processing steps that may be performed in an embodiment in accordance with techniques herein.
Figure 9:
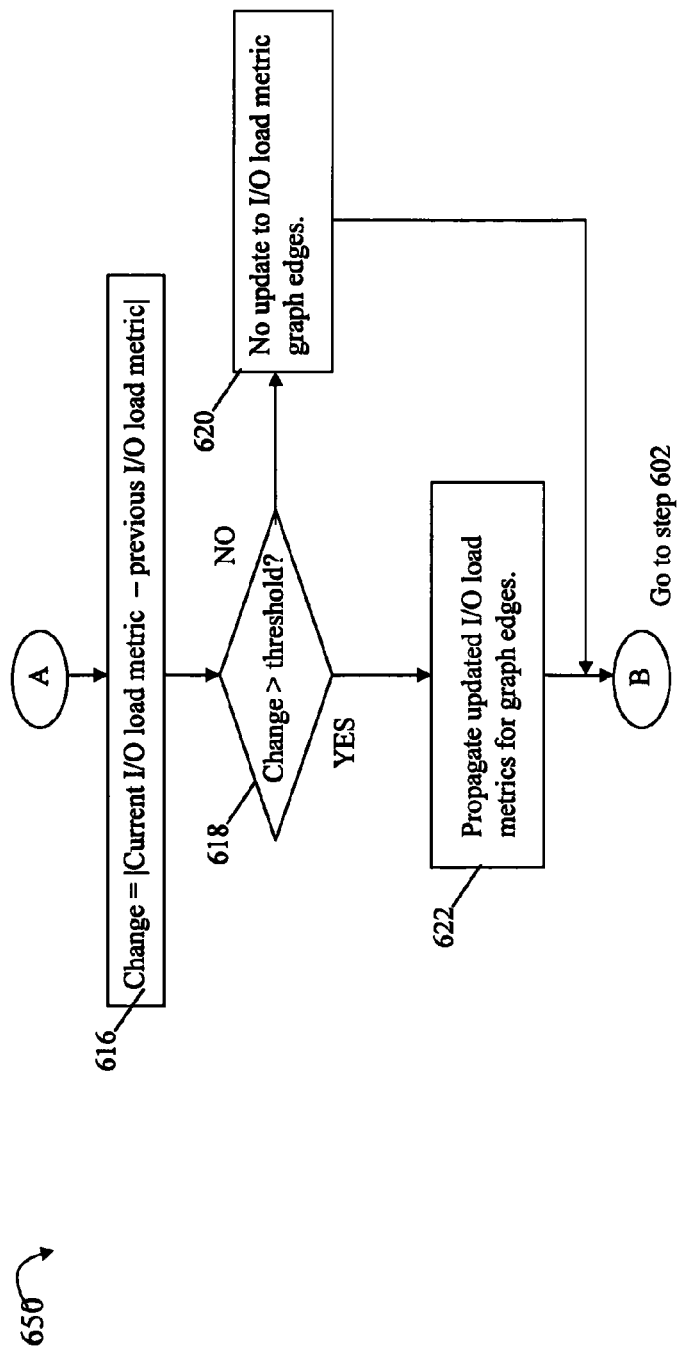

Referring to FIGS. 8 and 9, shown is a flowchart of processing steps that may be performed by a PDO for a physical device to determine the I/O load metric for a current time period. The processing of FIGS. 8 and 9 may be performed for each PDO in the system. At step 602, a determination is made as to whether the next time period occurrence has arrived. If not, control remains at step 602 until step 602 evaluates to yes. At step 604, the total number of I/Os for the current time period is obtained. At step 606, the sum of the priorities for all the I/Os directed to the physical device during the current time period is obtained. Step 606 is the result of adding all the priorities of the I/O operations directed to the physical device during the time period. At step 608, the maximum usage of the I/O buffer of the physical device is obtained for the current time period. It should be noted that the metrics of steps 604, 606, and 608 may be collected for the duration of the current time period as each I/O operation is received by the physical device for processing. At step 610, the average priority for the current time period may be calculated. The average priority is represented in EQUATION 1 described above. At step 612, the factor F, for the current time period is calculated. The factor F may be determined as represented in EQUATION 2 described above. At step 614, the current I/O load metric for the physical device is determined as the sum of the average priority and the factor F. The current I/O load metric is represented in EQUATION 3 above. At step 615, a change value may be determined which represents the amount of change or difference between the current I/O load metric for the current time period (e.g., T) and the previous I/O load metric for the previous time period (e.g. T−1). The change value of step 615 may be an absolute value representing the fact that the change may be positive or negative. At step 618, a determination is made as to whether the amount of change is larger than a threshold level of change. If not, control proceeds to step 620 where there is no update to the I/O load metric values of graph edges based on the current I/O load metric determined in step 614. Control proceeds to step 602. If step 618 evaluates to yes, appropriate edges of the graph are updated based on the current I/O load metric. As described above, the current I/O load metric is used to update edges connected, directly or indirectly, to a node corresponding to the PDO for the physical device. Control then proceeds to step 602.

It should be noted that an embodiment may also perform processing at each time period (e.g. every 3 seconds) to determine whether there have been any I/Os forwarded on each edge of the graph since the previous time period. If there have been no I/Os forwarded on an edge, the value of the I/O metric for the edge may be reduced by an amount, such as by 10%. The value of an edge may not be decreased to a value lower than the lowest data storage system internal priority (e.g., in connection with the table 310 of FIG. 5, an edge value will not be lower than 1).

Figure 10:
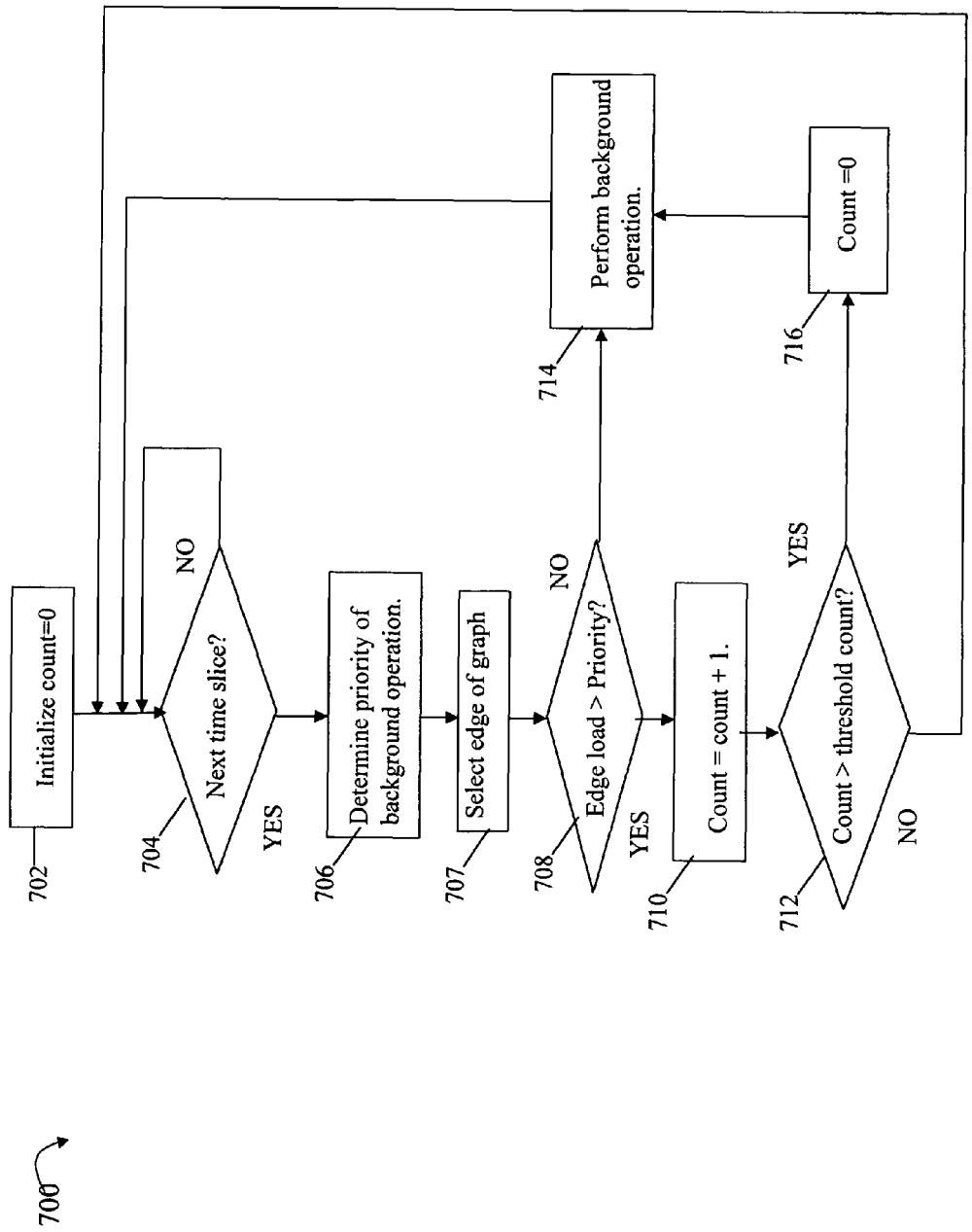

Referring to FIG. 10, shown is a flowchart of processing steps that may be performed in an embodiment in accordance with techniques herein in connection with a monitor thread of an object having a corresponding node in the graph for the system. As described above, each object may have its own monitor thread and processing of the flowchart 700 may be performed with respect to each monitor thread. At step 702, a count may be initialized to zero. The count may be used to track a number of times the monitor thread has determined not to forward or perform a background I/O operation. At step 704, a determination is made as to whether the monitor thread's next time slice has arrived (e.g., next time the monitor thread is scheduled for execution). Processing waits at step 704 until step 704 evaluate to yes. At step 706, a priority of the background operation to be performed is determined. At step 707, an edge of the path over which the background I/O operation will be sent is determined. The edge connects the node of the object with a second node in the path to the physical device to which the background I/O operation is directed. At step 708, a determination is made as to whether the value indicating the current I/O load of the selected edge is larger than the priority of the background I/O operation. If step 708 evaluates to no, control proceeds to step 714 to perform the background I/O operation. Step 708 includes forwarding the background I/O operation to the object associated with the second node on the path. Control then proceeds to step 704. If step 708 evaluates to yes, control proceeds to step 710 to increase the count by 1. At step 712, a determination is made as to whether the count is greater than a threshold. If step 712 evaluates to no, control proceeds to step 704. If step 712 evaluates to yes, control proceeds to step 716 where count may be reinitialized or reset to zero. The background operation is performed in step 714 and control then proceeds to step 704.

Figure 11:
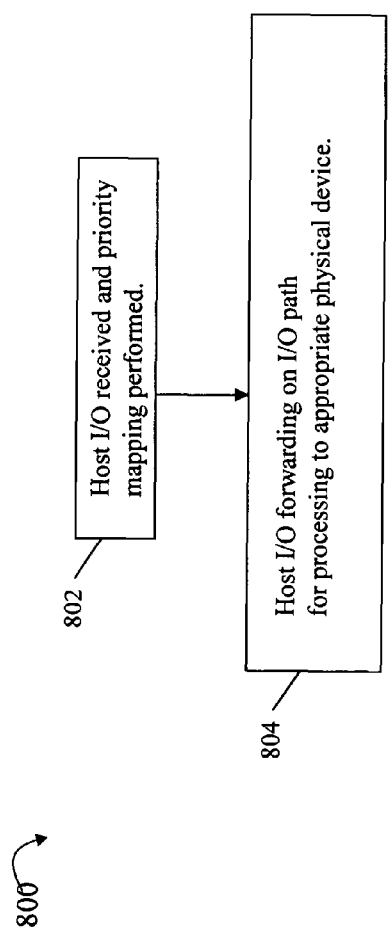

Referring to FIG. 11, shown is a flowchart of processing steps that may be performed in connection with a host or other externally generated I/O operation received by the data storage system. At step 802, the host I/O is received by the data storage system and the host I/O's priority is mapped to a corresponding data storage system internal priority such as described above using table 320 of FIG. 5. At step 804, the host I/O is forwarded on an appropriate I/O path for processing to the physical device to which the host I/O is directed.

Figure 12:
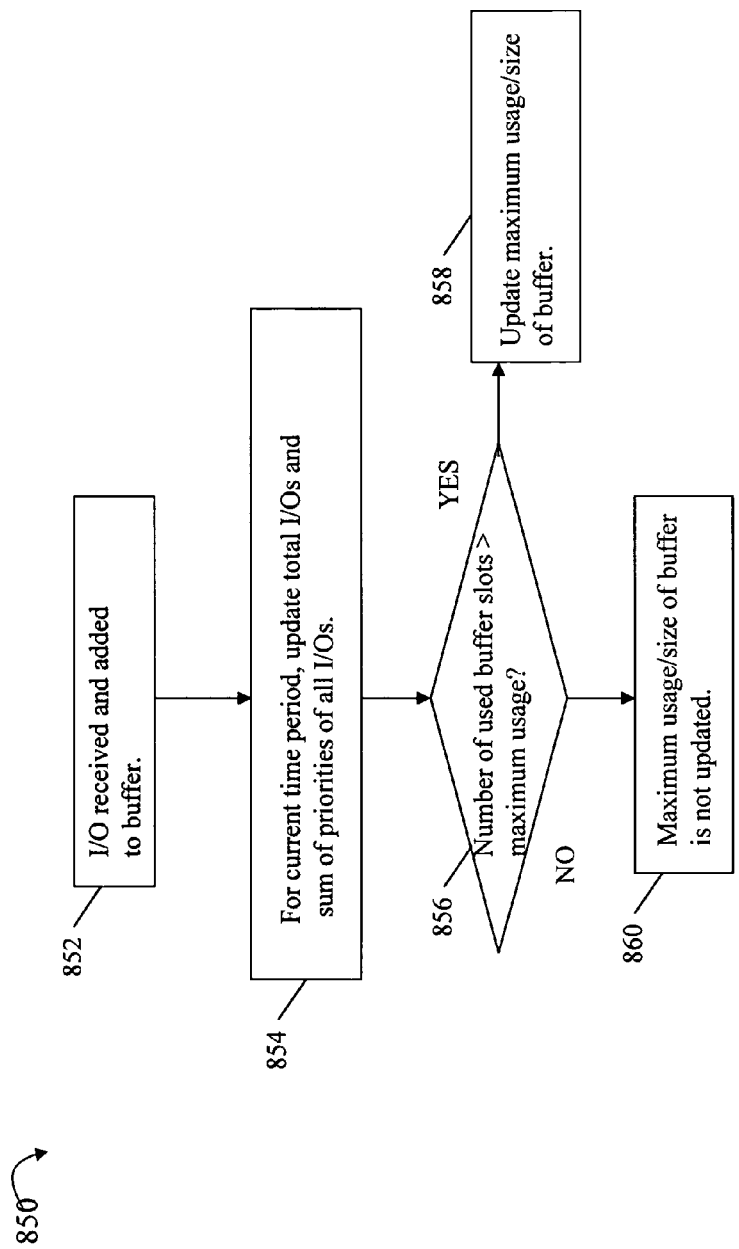

Referring to FIG. 12, shown is a flowchart of processing steps that may be performed in an embodiment by a PDO for each I/O received by a physical device. At step 852, the I/O is received at the physical device and added to the I/O buffer of the physical device. At step 854, for the current time period, the total number of I/Os and sum of their priorities may be updated. It should be noted that the foregoing two metrics which are updated in step 854 correspond to those used in connection with steps 604 and 606 of FIG. 8. At step 856, a determination is made as to whether the number of used I/O buffer slots or entries is more than a current value recorded for the maximum usage. Maximum usage indicates the largest number of entries in the I/O buffer observed during the current time period. If step 856 evaluates to yes, control proceeds to step 858 to update the current value for the maximum usage. If step 856 evaluates to no, control proceeds to step 860 where the maximum usage is not updated.

An embodiment using the techniques herein provides each object represented in the graph with independent control over the rate at which its monitor thread populates the system with background operations to be performed for the object. Each monitor thread knows priorities of background operations as described above in connection with the table 310 of FIG. 5. When a new background operation is added, the tables containing the associated priorities used by the monitor threads may be updated. Use of such tables also provides additional flexibility and advantages. For example, an embodiment may have different priorities assigned to the same background operation for different RAID Groups, different LUNs, and the like. Each of the foregoing LUNs may have a corresponding object and monitor thread using a different set of priorities for background operations. For example, the monitor thread for each LUN may use a different set of priorities for background operations based on a service level for the LUN, the particular application using the LUN, and the like.

Referring to FIG. 13, shown is an example of a portion of a graph of a data storage system in accordance with techniques herein. The example 900 includes a node 902 for LUN A, node 904 corresponding to a RAID Group (RG)2, and node 906 corresponding to RG 1. Each of the nodes 904 and 906 may include other descendant nodes such as illustrated in FIGS. 4 and 7 for drives or members of the RGs. Node 902 may be a descendant node of one or more other nodes. The example 900 of FIG. 13 may represent a portion of nodes of a graph, for example, at levels 2 and 3 of a graph similar to that as illustrated in FIGS. 4 and 7. In this example, LUN A is included in two RGs-RG1 and RG2. Each of the RGs may have a different underlying RAID protection level (e.g., RAID 0, 1, 2, 3, 5, 6) and/or RAID configuration (e.g., varying number of data and/or parity drives). The foregoing nodes may reflect a portion of the graph formed as a result of data storage configuration commands to create RG1 and RG2. Configuration command(s) may also be issued to relocate or move LUN A from RG1 to RG2. As a result of the configuration commands, the monitor process of the LUN A object represented by node 902 may issue read and write commands as background I/O operations to relocate LUN A from RG1 to RG2. In particular, the monitor process for the LUN A object 902 may issue read background I/O operations along the path including edge 902b and issue write background I/O operations along the path including edge 902a. When such background I/O operations are issued may be performed in accordance with values of I/O load metrics associated with edges 902a, 902b and the priorities of the background I/O operations in accordance with techniques herein. In this example, it should be noted that the read and write commands are not I/O commands originated by the host or other client external to the data storage system. Rather, configuration commands may be issued to alter RAID group configurations and cause movement or relocation of LUN A from RG1 to RG2. The resulting I/O operations related to the movements or relocation of LUN A may be background I/O operations initiated by the monitor process in accordance with the configuration commands. In one embodiment as described herein, such background I/O operations may be initiated within the back-end of the data storage system, such as by a DA of the data storage system.

In accordance with distributed techniques herein, each object in the system controls whether to forward and perform its own background operations. Using the graph and edge values described herein, the object may determine if the path it will use to send the background I/O operation is heavily used or not. For each physical device, parameters affecting the physical device load may be monitored, These parameters may include monitoring the number of used entries in the physical drive's I/O buffer size and the priorities of the I/Os flowing through the system. Based on the foregoing for each physical drive, various I/O loads on the paths used by the objects may be determined. When an object wants to send a background IO on a path, the priority of the background I/O may have to be the same or larger than the I/O load metric reflected on the path. If the priority of the background operation is smaller, the object will yield and try again later. After a few failed attempts, the object may send the background I/O on the path even if the priority of the background I/O is smaller than the I/O load metric for the path.

As described herein, each I/O packet has a priority in accordance with the operation it performs. As packets flow down the edges of the graph between objects represented therein from the root, the packets for the I/O operations are received at the physical drive. A PDO for the physical drive may track the I/O load that goes through the drive, and generate an I/O load metric on the edges which are connected to the PDO in the graph. This I/O load metric may then be propagated up to other edges in the graph and used in determining values for other edges in the graph. When the monitor of any object wants to forward a background operation on a path including an edge extending from the object's node in the graph, the object obtains the value of the I/O load metric for the edge. When the value of the I/O load metric for the edge is larger than the priority of the background operation, the monitor gives up its current time slice and does not issue the background I/O operation. The foregoing process of not issuing a background I/O operation at a point in time by a monitor thread may be performed up to a threshold number of times after which the background I/O operation may be forwarded independent of whether the I/O load metric for the edge is larger than the priority of the background operation in order to avoid possibly never performing the background I/O operation (e.g., which may occur if the I/O load metric for the edge is always larger than the priority of the background operation). An embodiment may use the foregoing or another technique to avoid such an occurrence.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing I/O operations in a system comprising:
   receiving a graph including a plurality of nodes and edges between pairs of said plurality of nodes, said graph including a plurality of levels of nodes, said plurality of levels including a first level with a root node and one or more other levels each including a portion of said plurality of nodes, each node in said one or more other levels representing an object corresponding to a physical or logical entity in the system, each of said edges having a value indicating an I/O load metric;
   determining, by a thread for a first of said plurality of nodes included at a first of said one or more other levels, whether to perform a background I/O operation that is directed to a first device and has a first priority, said determining including comparing said first priority to a first value of an I/O load metric of a first edge between said first node and a second of said plurality of nodes, wherein said first value is determined in accordance with criteria for a time period, said criteria including a maximum usage of an I/O buffer of the first device and priorities of other I/O operations directed to said first device; and
   if it is determined that said background I/O operation is to be performed, forwarding said background I/O operation for processing on an I/O path having a corresponding path in said graph, said corresponding path including said first node, said first edge, and said second nod; wherein said receiving, said determining and said forwarding are performed using a processor.

2. The method of claim 1, wherein if it is determined that said background I/O operation is not to be performed, a counter tracking a number of times said background I/O operation is not performed, is updated.

3. The method of claim 1, wherein, if said first value is greater than said first priority, performing first processing including:
   determining whether said thread has previously determined not to perform the background operation a threshold number of times; and
   if the thread has previously determined not to perform the background operation a threshold number of times, performing the background operation, and otherwise, updating a counter indicating a current number of times the thread has determined not to perform the background operation.

4. The method of claim 1, wherein, if said first value is not greater than said first priority, it is determined that the background I/O operation is to be performed and said forwarding is performed.

5. The method of claim 1, wherein said background I/O operation is directed to a first physical device having a corresponding first leaf node in said graph.

6. The method of claim 5, wherein said corresponding path includes said corresponding first leaf node.

7. The method of claim 1, further comprising:
   receiving, from a client external to the system, a second I/O operation directed to a second device of the system; and
   forwarding the second I/O operation for processing on a second I/O path, having a second corresponding path in said graph, said second corresponding path including one of said plurality of nodes corresponding to said second device.

8. The method of claim 7, further comprising:
   mapping a second priority of said second I/O operation to a third priority, wherein said second priority is a priority from a first set of client-specified priorities for said client and wherein said third priority is a priority from a second set of system-specified priorities for said system.

9. The method of claim 1, further comprising:
   periodically performing first processing by a thread for an object corresponding to said first device, said first processing including:

determining a current value for an I/O load metric for the first device; and determining whether to performing processing to update one or more values of one or more edges of said graph.

10. The method of claim 9, wherein said first processing further comprises performing, for a current time period:

determining an average priority of I/O operations directed to the first device for the current time period;

determining a factor for the current time period, wherein the factor is determined in accordance with said maximum usage; and determining said current value by adding said average priority and said factor.

11. The method of claim 10, wherein said factor for a time period, T, for the first device is represented as $$\text{Factor}(T) = \frac{(\text{said maximum usage} - (\text{buffer size}/2)) * (\text{maximum priority}/2)}{(\text{buffer size}/2)}$$

wherein buffer size represents a number of entries in the I/O buffer, said maximum usage representing a largest amount of entries in the I/O buffer occurring at a point in time in the time period T, and maximum priority is a largest possible priority assignable to an I/O operation.

12. The method of claim 9, wherein said current value is specified for one edge of said graph between one of said plurality of nodes corresponding to said first device and another one of said plurality of nodes.

13. The method of claim 12, wherein for a node N1 at level N in the graph having a plurality of child nodes which are at level N+1 of the graph and connected to said node N1 by a first set of edges, a: value of an edge E2 between said node N1 and a parent node N2 at a level N−1 of the graph is determined in accordance with values of edges of said first set.

14. The method of claim 1, wherein the system is a data storage system.

15. The method of claim 14, wherein the background I/O operation is an I/O operation initiated within a backend of the data storage system and not initiated as a result of an I/O operation from a client external to the data storage system.

16. The method of claim 15, wherein the background I/O operation includes any of a RAID rebuild operation to read or write parity or user data of a RAID group, writing a value to initialize a portion of a physical device, and performing an I/O operation to assess or monitor status of a physical device.

17. The method of claim 9, wherein determining whether to perform processing to update one or more edges of said graph includes determining whether said current value for an I/O load metric for a current time period, T, has changed by a threshold amount with respect to an immediately preceding time period, T−1.

18. The method of claim 1, wherein, periodically, values of an I/O load metric for physical devices corresponding to leaf nodes of the graph are calculated, and if one or more of said values for a time period T have changed by a threshold amount with respect to other values of an I/O load metric for the physical devices for an immediately preceding time period, T−1, said one or more values for a portion of said leaf nodes are used to determine updated values for a portion of the edges included on one or more paths of the graph, each of the one or more paths including a leaf node from the portion and the root node.

19. A non-transitory computer readable medium comprising code stored thereon for performing I/O operations in a system, the non-transitory computer readable medium comprising code stored thereon which, when executed performs processing including:

receiving a graph including a plurality of nodes and edges between pairs of said plurality of nodes, said graph including a plurality of levels of nodes, said plurality of levels including a first level with a root node and one or more other levels each including a portion of said plurality of nodes, each node in said one or more other levels representing an object corresponding to a physical or logical entity in the system, each of said edges having a value indicating an I/O load metric;

determining, by a thread for a first of said plurality of nodes included at a first of said one or more other levels, whether to perform a background I/O operation that is directed to a first device and has a first priority, said determining including comparing said first priority to a first value of an I/O load metric of a first edge between said first node and a second of said plurality of nodes, wherein said first value is determined in accordance with criteria for a time period, said criteria including a maximum usage of an I/O buffer of the first device and priorities of other I/O operations directed to said first device; and if it is determined that said background I/O operation is to be performed, forwarding said background I/O operation for processing on an I/O path having a corresponding path in said graph, said corresponding path including said first node, said first edge, and said second node.

20. The non-transitory computer readable medium of claim 19, wherein if it is determined that said background I/O operation is not to be performed, a counter tracking a number of times said background I/O operation is not performed is updated.

* * * * *